US012579796B2

(12) United States Patent
Möller et al.

(10) Patent No.: US 12,579,796 B2
(45) Date of Patent: Mar. 17, 2026

(54) SYSTEMS AND METHODS FOR PROCESSING SELECTED PORTIONS OF RADAR DATA

(71) Applicant: GM Cruise Holdings LLC, San Francisco, CA (US)

(72) Inventors: Sven Möller, Lubbecke (DE); Michael Meyer, Munich (DE); Marc Unzueta, Munich (DE); Filippo Grazioli, Heidelberg (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 293 days.

(21) Appl. No.: 18/459,768

(22) Filed: Sep. 1, 2023

(65) Prior Publication Data

US 2025/0078485 A1 Mar. 6, 2025

(30) Foreign Application Priority Data

Sep. 1, 2023 (EP) ..................................... 23194843

(51) Int. Cl.
| | |
|---|---|
| *G06V 10/24* | (2022.01) |
| *G01S 7/41* | (2006.01) |
| *G01S 13/42* | (2006.01) |
| *G01S 13/86* | (2006.01) |

(Continued)

(52) U.S. Cl.
CPC ............ *G06V 10/806* (2022.01); *G01S 7/417* (2013.01); *G01S 13/426* (2013.01); *G01S 13/865* (2013.01);

(Continued)

(58) Field of Classification Search
CPC ...... G06V 10/806; G06V 10/24; G06V 10/40; G06V 10/82; G06V 20/56; G06V 10/454;

(Continued)

(56) References Cited

U.S. PATENT DOCUMENTS

| | | | |
|---|---|---|---|
| 2023/0204722 A1* | 6/2023 | Harrison ................ | G06N 3/096 |
| | | | 342/115 |
| 2023/0213623 A1 | 7/2023 | Li et al. | |

OTHER PUBLICATIONS

Z. Liu et al., "BEVFusion: Multi-Task Multi-Sensor Fusion with Unified Bird's-Eye View Representation," 2023 IEEE International Conference on Robotics and Automation (ICRA), London, United Kingdom, Jul. 2023, pp. 2774-2781 (Year: 2023).*

(Continued)

*Primary Examiner* — Robert W Hodge
*Assistant Examiner* — Bongani Jabulani Mashele
(74) *Attorney, Agent, or Firm* — CANTOR COLBURN LLP

(57) ABSTRACT

Systems and methods for automatic removal for selected training data from a dataset are provided. Systems and methods are provided for identifying portions of radar data that contain information that is not present in camera and/or lidar data. The identified portions of the radar data can be processed by a neural network to provide the additional information. The identified parts of the radar data can then be processed while the remaining parts of the radar data remain unprocessed. In various examples, features can be extracted from identified regions of the radar data using a neural network and fused with camera and/or lidar features. In some examples, the fused features can be used for object detection.

20 Claims, 7 Drawing Sheets

<u>300</u>

(51) Int. Cl.

| | |
|---|---|
| *G01S 13/931* | (2020.01) |
| *G06V 10/40* | (2022.01) |
| *G06V 10/80* | (2022.01) |
| *G06V 10/82* | (2022.01) |
| *G06V 20/56* | (2022.01) |

(52) U.S. Cl.
CPC .......... *G01S 13/867* (2013.01); *G01S 13/931* (2013.01); *G06V 10/24* (2022.01); *G06V 10/40* (2022.01); *G06V 10/82* (2022.01); *G06V 20/56* (2022.01); *G01S 2013/932* (2020.01); *G01S 2013/9322* (2020.01)

(58) Field of Classification Search
CPC ....... G06V 20/58; G01S 7/417; G01S 13/426; G01S 13/865; G01S 13/867; G01S 13/931; G01S 2013/932; G01S 2013/9322; G01S 13/42; G01S 13/89; G01S 17/86; G01S 17/89; G01S 17/931; B60W 60/001; B60W 2420/403; B60W 2420/408

See application file for complete search history.

(56) References Cited

OTHER PUBLICATIONS

HVDetFusion: A Simple and Robust Camera-Radar Fusion Framework Kai Lei, Zhan Chen, Shuman Jia, Xiaoteng Zhang, Jul. 2023 (Year: 2023).*

Liu et. al. BEVFusion: Multi-Task Multi-Sensor Fusion with Unified Bird's-Eye View Representation (Year: 2023).*

Lei et. al., HVDetFusion: A Simple and Robust Camera-Radar Fusion Framework (Year: 2023).*

Kai Lei et al, "HVDetFusion: A Simple and Robust Camera-Radar Fusion Framework", arxiv.org, Cornell University Library, 201 Olin Library Cornell University Ithaca, NY 14853, Jul. 21, 2023 (Jul. 21, 2023), XP091570263, p. 3, col. 1; p. 4, col. 2; p. 5, col. 1; figures 1, 2, 3.

Zhijian Liu et al, "BEVFusion: Multi-Task Multi-Sensor Fusion with Unified Bird's-Eye View Representation", 2023 IEEE International Conference on Robotics and Automation (ICRA), IEEE, May 29, 2023 (May 29, 2023), XP034369812, pp. 2774-2781, abstract, Figure 2.

Jinhyeong Kim et al, "Low-Level Sensor Fusion for 3D Vehicle Detection Using Radar Range-Azimuth Heatmap and Monocular Image", Dec. 8, 2022 (Dec. 8, 2022), Topics in Cryptology—CT-RSA 2020 : The Cryptographers' Track at the RSA Conference 2020, San Francisco, CA, USA, Feb. 24-28, 2020, pp. 388-402 and Figures 1-5, XP047577720.

European Patent Office, European Search Report for EP Patent Application No. 231948431, Feb. 2, 2024.

Vaswani et al., "Attention Is All You Need", 31st Conference on Neural Information Processing Systems (NIPS 2017), Long Beach, CA, USA, arXiv:1706.03762v5[cs.CL] Dec. 6, 2017, 15 pages.

* cited by examiner

100

100

SYSTEMS AND METHODS FOR PROCESSING SELECTED PORTIONS OF RADAR DATA

PRIORITY INFORMATION

This application claims priority to European patent application number EP23194843.1 filed on 1 Sep. 2023, titled "SYSTEMS AND METHODS FOR PROCESSING SELECTED PORTIONS OF RADAR DATA". The European patent application is hereby incorporated by reference in its entirety.

BACKGROUND

Technical Field

The present disclosure generally relates to autonomous vehicles (AVs) and, more specifically, to processing AV sensor data.

INTRODUCTION

AVs, also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
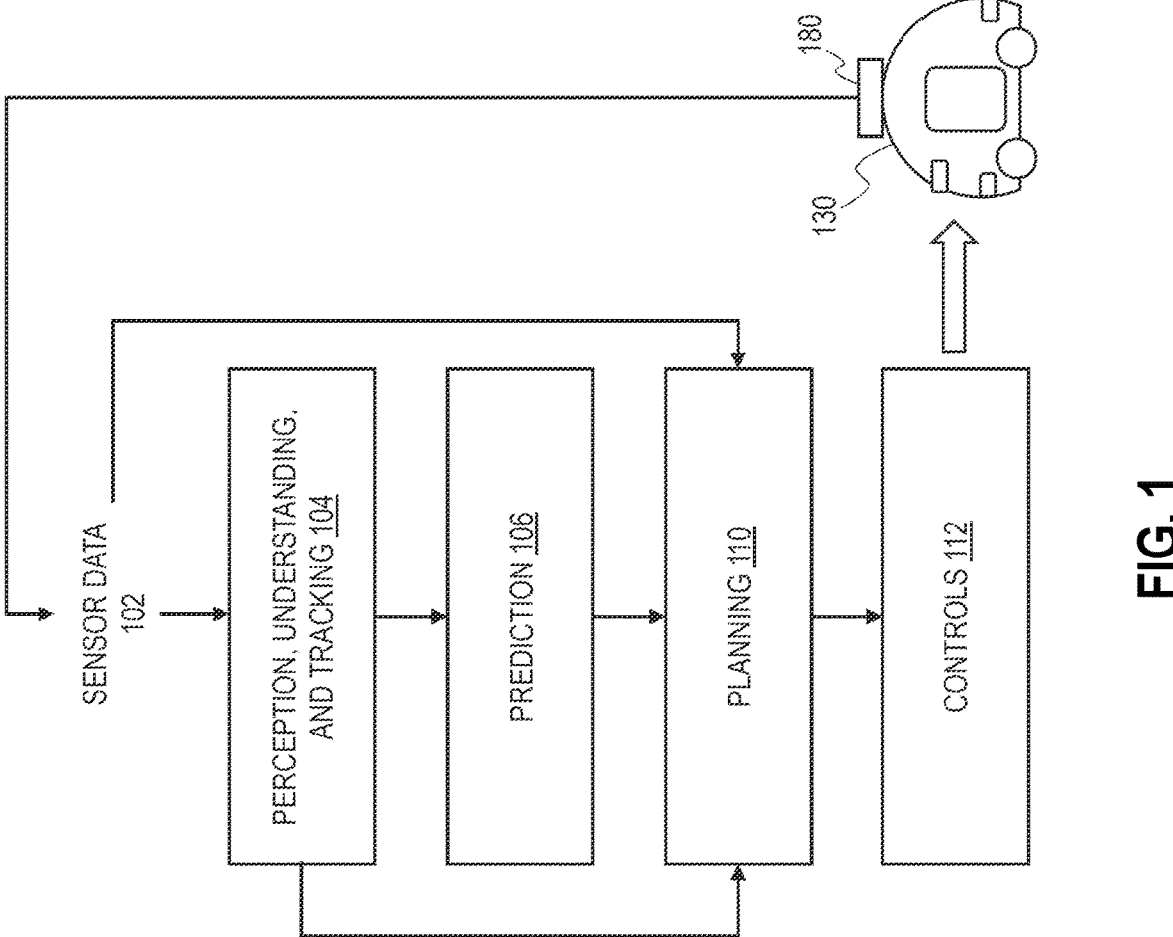
FIG. 1 illustrates an exemplary AV stack and an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. AVs include multiple sensors and use sensor data to perceive AV surroundings, including both static and moving objects. AVs utilize perception and understanding of AV surroundings to plan a trajectory for the AV.

An AV can include many different types of sensors, including, for example, cameras, light detection and ranging (lidar) sensors, radio detection and ranging (radar) sensors, time-of-flight sensors, accelerometers, gyroscopes, inertial measurement units, and the like. However, processing all the sensor data for all of the sensors can be computationally expensive. In various examples, for multiple sensors and for multiple types of sensors, a vehicle can have data for a full 360 degrees field of view. The vehicle can have separate streams of data captured by different sensors having different fields of views. Systems and methods are provided herein for identifying portions of data that provide useful information. In particular, systems and methods are provided herein for identifying selected portions of radar data for processing for object detection.

An object detection model is an example of an AV system that utilizes sensor data from various types of AV sensors. In some examples, an object detection model primarily relies on camera data and lidar data to detect objects in an AV's environment. Radar sensors can provide additional information for an object detection model. In general, to incorporate radar data for use in an object detection model, a radar point cloud is extracted from the raw radar data cube using a fixed heuristic, and the radar point cloud is fused with camera and lidar data. However, valuable radar data can be lost in the process of extracting the point cloud. Thus, in order to retain and process all valuable data, it is preferable to process the raw radar data cube directly using a neural network (e.g., a convolutional neural network, a transformer, etc.) rather than processing the radar point cloud. However, processing the entire raw radar data cube using a neural network is computationally expensive.

In some implementations, systems and methods are provided for identifying portions of a raw radar data cube that contain information that is not present in camera and/or lidar data. The identified portions of the raw radar data cube can be processed by a neural network to provide the additional information. In various examples, the regions of the raw radar data cube that contain additional information can depend on the driving situation. For instance, in a highway driving scenario, the radar data can add valuable long range information about objects and situations ahead. In another example, in a city or town where the AV is driving more slowly, the radar data can add valuable information when visibility is decreased such as in fog or precipitation.

According to various implementations, a feature fusion model is provided that processes camera and lidar data and then uses an attention module to predict which parts of the raw radar cube may contain information missing from the camera and lidar data. In some examples, the attention module can use a heatmap to identify parts of the raw radar cube that may contain missing information. In some examples, the attention module uses a transformer to query various regions of the raw radar data cube and identify parts of the raw radar cube that may contain missing information. The identified parts of the raw radar data cube can then be processed while the remaining parts of the raw radar data cube remain unprocessed. In various examples, features can be extracted from identified regions of the radar data cube using a neural network (e.g., a convolutional neural network, a transformer, etc). In some examples, the feature fusion model outputs fused features to an object detection head which outputs predicted objects. In some examples, the output fused features can be used for semantic segmentation. IN some examples, the output fused features can be used for free space detection.

Various embodiments herein and their advantages may apply to a wide range of vehicles (e.g., semi-autonomous vehicles, vehicles with driver-assist functionalities, etc.), and not just AVs.

Exemplary AV and an AV Stack that Controls the AV

FIG. 1 illustrates an exemplary AV stack and an AV 130, according to some aspects of the disclosed technology. An AV 130 may be equipped with a sensor suite 180 to sense the environment surrounding the AV and collect information (e.g., sensor data 102) to assist the AV in making driving decisions. The sensor suite 180 may include, e.g., sensor systems 504, 506, and 508 of FIG. 5. The AV stack may include perception, understanding, and tracking part 104, prediction part 106, planning part 110, and controls part 112. The sensor data 102 may be processed and analyzed by perception, understanding, and tracking part 104 to identify and track objects in the environment of the AV and determine a perception and understanding of the environment of the AV 130. Prediction part 106 may determine future motions and behaviors of the AV and/or tracked objects in the environment of the AV 130. The AV 130 may localize itself based on location information (e.g., from location sensors) and the map information. The planning part 110 may create planned paths or trajectories based on one or more of: information from perception, understanding, and tracking part 104, information from prediction part 106, the sensor data 102, map information, localization information, etc. Subsequently, planned paths or trajectories can be provided to controls part 112 to generate vehicle control commands to control the AV 130 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 510 of FIG. 5. At least a part of the AV stack may be implemented on the computing system 600 of FIG. 6 and/or encoded in instructions of storage device 630 of FIG. 6.

Exemplary Perception, Understanding, and Tracking Architecture

Figure 2:
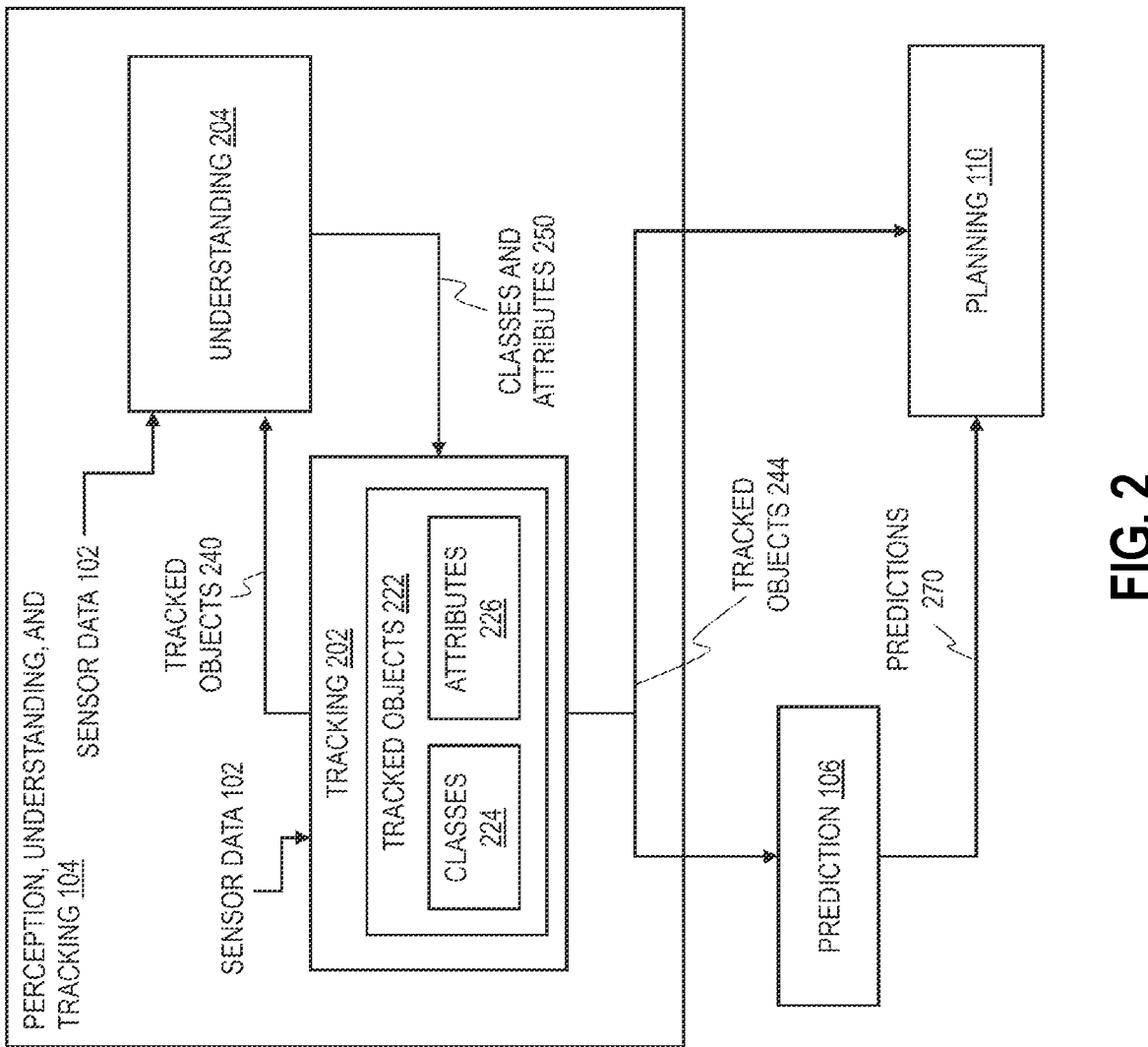
FIG. 2 illustrates an exemplary implementation of perception, understanding, and tracking part, prediction part, and planning part, according to some aspects of the disclosed technology.

FIG. 2 illustrates an exemplary implementation of perception, understanding, and tracking part 104, prediction part 106, and planning part 110, according to some aspects of the disclosed technology. The figure illustrates one exemplary configuration and arrangement of parts within an AV stack and is not intended to be limiting to the disclosure.

Perception, understanding, and tracking part 104 may include tracking part 202 and understanding part 204. Tracking part 202 may receive sensor data 102 from a sensor suite of an AV (the sensor suite may include, e.g., sensor systems 504, 506, and 508 of FIG. 5). Tracking part may determine from the sensor data 102 presence of objects in an environment of the AV and track the objects presence over time (or across frames of data). In some examples, the tracking part receives object detention data from the understanding part 204. The presence of an object can be encoded as a bounding box defining boundaries and location of an object in a three-dimensional space. The presence of an object can be encoded as location information and size information that specify the object's occupancy in space.

Understanding part 204 may receive sensor data 102 and optionally tracked objects information 240 (of tracked objects 222) to understand the objects in the environment of the AV. In some examples, the understanding part 204 can include a feature fusion part, such as the feature fusion part 300 of FIG. 3, and the understanding part 204 can predict object detections (e.g., classes and attributes 250), which can then be transmitted back to the tracking part 202. In some examples, the feature fusion part can be used for object detection. In various examples, the understanding part 204 can predict three dimensional (3D) object detections. Understanding part 204 may process sensor data 102, e.g., using one or more machine learning models, to produce inferences about the tracked objects 222, such as one or more classes and/or one or more attributes for tracked objects 222. Understanding part 204 may provide classes and attributes 250 as feedback information to tracking part 202. Directly or indirectly, classes and attributes 250 produced by understanding part 204 may be provided to prediction part 106 and/or planning part 110 to assist prediction and/or planning functionalities respectively.

As illustrated in the figure, tracking part 202 may serve as a classes and attributes collector and can collect and maintain classes 224 and/or attributes 226 for tracked objects 222. The objects and information associated with the objects may be maintained as tracked objects 222 in tracking part 202. Tracked objects 222 may be in a format of a database or collection of data that includes data entries for tracked objects 222, where each data entry for a tracked object may include information for the tracked object, such as an object identifier of the tracked object, bounding box of the tracked object, one or more classifications of the tracked object, and one or more attributes of the tracked object. Tracked objects 222 may be in a different format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object.

Perception, understanding, and tracking part 104 may provide tracked objects information 244 (of tracked objects 222) to prediction part 106. Perception, understanding, and tracking part 104 may provide tracked objects information 244 (of tracked objects 222) to planning part 110. Prediction part 106 may provide predictions 270 to planning part 110. Tracked objects information 240 and/or tracked objects information 244 may include at least some of the information maintained in tracked objects 222. Tracked objects information 244 provided from tracking part 202 to prediction part 106 and planning part 110 may include information produced by tracking part 202 and information produced by understanding part 204.

Exemplary Feature Fusion Part

Figure 3:
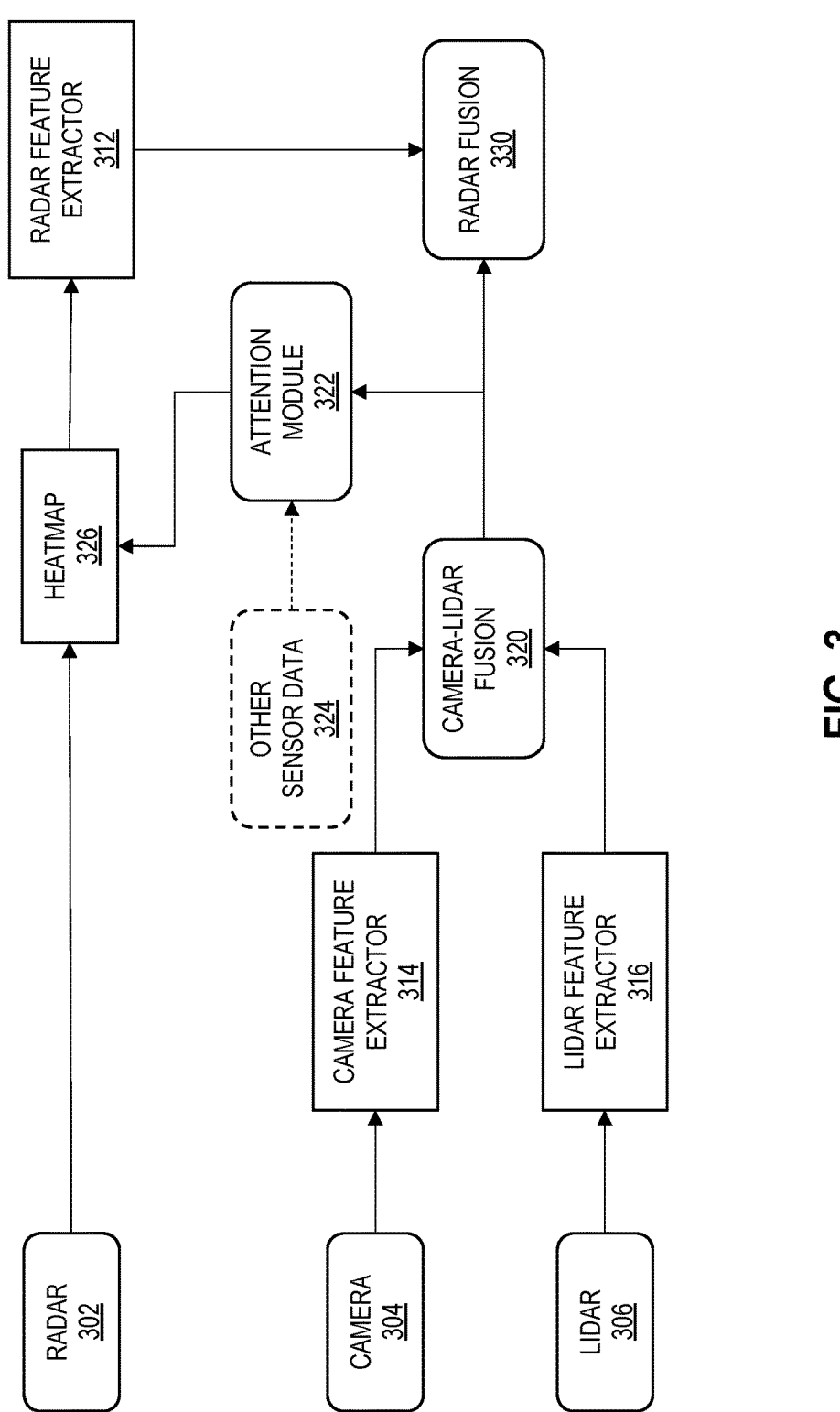
FIG. 3 is a block diagram illustrating an exemplary implementation of a feature fusion part, according to some aspects of the disclosed technology.

FIG. 3 is a block diagram illustrating an exemplary implementation of a feature fusion part 300, according to some examples of the present disclosure. According to various examples, the feature fusion part 300 can process camera 304 data and lidar 306 data, and, based on camera 304 and lidar 306 data, the feature fusion part 300 can identify selected portions of radar 302 data for processing. In particular, the feature fusion part 300 primarily relies on camera 304 data and lidar 306 data to detect objects in an AV's environment, while data from radar sensors can provide additional information. Selectively processing radar data for areas of interest can improve efficiency of the feature fusion part 300 and result in cost savings. In various examples, FIG. 3 shows feature extraction and feature fusion of camera, lidar and radar. The output of the radar fusion part 330 is the fused features of these three sensor modalities. The fused features can be used for an arbitrary downstream task like (3D) object detection, free space detection, semantic segmentation, etc. Thus, to complete object detection, the feature fusion part 300 can include an object detection head after the radar fusion module 330.

In various examples, the regions of the raw radar data cube that contain additional information can depend on the driving situation. For instance, when a vehicle is traveling above a selected speed, the radar data can add valuable long range information about objects and situations ahead. In another example, when a vehicle is driving more slowly, the radar data can add valuable information when visibility is decreased such as in fog or precipitation.

As shown in FIG. 3, a camera feature extractor 314 extracts features from camera data. Similarly, a lidar feature extractor 316 extracts features from lidar data. In various examples, the camera feature extractor 314 and/or the lidar feature extractor 316 can be neural network models designed for feature extraction. The output of the camera feature extractor 314 and the output of the lidar feature extractor 316 are fused at a camera-lidar fusion module 320. The fusion of the extracted camera features with the extracted lidar features can be completed by a neural networks, such as a convolutional neural network or a transformer. In some examples, extracted camera data can be stacked with extracted lidar features and processed with a convolutional neural network. In some examples, feature extractors can output both camera features and lidar features in birds eye view with the same spatial dimension (H×W dimensions), although the feature extractors can have a different number of feature channels. Thus, for instance, in one example, camera features are represented by a 3D tensor of shape C1×H×W, while lidar features are represented by a 3D tensor of shape C2×H×W, and stacked lidar plus camera features also have a 3D tensor of shape, represented by: (C1+C2)×H×W. The process then stacks the lidar+camera features in a CNN, and output is fused features represented by a 3D tensor of shape C3×H×W. Note that other representations for the fused features (like a sequence of tokens where tokens are vectors) are also possible. In some examples, during the processing of the features, the data can be represented as a matrix of fused values, such as a v-matrix.

In some examples, the camera feature extractor 314 and the lidar feature extractor 316 can be models trained in an end-to-end fashion. In particular, in some examples, the camera feature extractor 314 and the lidar feature extractor 316 are models that received input data (e.g., camera data, lidar data) as well as output to predict (e.g., ground truth 3D objects), and did not receive any intermediate supervision or direction (e.g., the camera feature extractor 314 and the lidar feature extractor 316 are not given ground truth data for the heat map). Thus, the camera feature extractor 314 and the lidar feature extractor 316 models implicitly learn which parts of the radar cube to focus on by solving the task of 3D object detection.

In some examples, the extracted camera features are represented in perspective view and the extracted lidar features are represented in birds eye view. The extracted camera features are combined with the extracted lidar features at the camera-lidar fusion module 320, which can output a sequence of tokens representing the combined extracted features. In some examples, the camera features are transformed to birds eye view features, such that both the lidar features and the camera features are in birds eye view when the features are combined at the camera-lidar fusion module 320. In some examples, the output of the camera-lidar fusion module is a 3D tensor representing a birds eye view grid with multiple feature channels (e.g., C×H×W, where C=the number of feature channels and where H×W=spatial dimension of the birds eye view grid). In one example, an orthographic feature transform can be used to transform the camera features from perspective view to bird's eye view. In some implementations, only one of camera data and lidar data is used in the object detection model 300. The camera-lidar fusion module 320 may combine camera features and lidar features, and output the fused features (e.g., a fused feature vector or matrix such as a 3D tensor of shape C×H×W as described above) that combines information from the camera features and the lidar features, even if the position of salient or important information are in positioned differently in the camera features and the lidar features.

In various implementations, additional and/or alternative sensor data can be used for feature extraction. For example, different types of sensors can generate different types of sensor data, and a feature extractor can extract features from the different type of sensor data. In various examples, the different type of sensor data features can be combined with one or both of the camera features and the lidar features. In some examples, two different types of sensor data are used with two different types of feature extractors and the two different types of generated features are combined.

The output from the camera-lidar fusion module 320 is input to an attention module 322. The attention module 322 processes the camera-lidar fusion output and generates a heatmap 326. The heatmap 326 indicates areas in which radar data can be used to provide additional information. In various examples, the attention module 322 can be a neural network (e.g., a convolutional neural network, a transformer, etc). In one example, when the attention module 322 is a convolutional neural network, the input to the attention module 322 includes extracted features in birds eye view. When the attention module 322 is based on a transformer model, the input can include extracted features in other views, such as extracted camera features in perspective view. In general, when the attention module 322 is based on a transformer model, the input can include various feature representations.

In various examples, the attention module can learn to predict which parts of the raw radar cube data contain additional information through training of the attention neural network through machine learning. The attention module 322 can encode the data output from the camera and lidar fusion module 320 in one or more attention matrices. Values in the attention matrices may be computed through supervised training. In various examples, the attention module 322 can encode the data output in any selected representation to encode the locations in the radar cube to focus on for radar feature extraction.

The attention module 322 processes the extracted camera and lidar features and predicts which parts of the raw radar cube data contain complementary information. Thus, based on the input from the camera-lidar fusion module, the attention module identifies portions of a raw radar data cube that are likely to contain additional information that is not present in camera and/or lidar data. The identified portions of the raw radar data cube can be processed by a neural network to provide the additional information. In some examples, the attention module 322 can receive input data 324 from other sensors. For example, the attention module 322 can also consider vehicle velocity, acceleration, ambient weather conditions, the planned path of the vehicle, as well as other data. In various examples, the attention module 322 is a convolution neural network, and any number of input channels can be added to the input of the attention module 322.

In various examples, the attention module 322 outputs a heatmap 326 indicating the areas of the radar data cube which are to be processed. In some examples, the heatmap 326 includes indices of locations in the radar cube to be processed, and based on the indicated locations, convolutions on the radar cube can be performed. The heatmap can be a matrix representing the attention from each patch of the fused camera-lidar features to each patch of the radar cube. In some examples, the heatmap 326 can be a mask that is applied to the raw radar 302 data cube, indicating the areas of the raw radar data cube are to be processed at the radar feature extractor 312. In some examples, beamforming is performed on the radar 302 data based on the heatmap 326, such that beamforming is only performed on the radar data corresponding to the areas of the heatmap for which radar data is to be extracted.

Based on the heatmap 326, the radar feature extractor 312 processes selected portions of the radar 302 data. The output from the radar feature extractor 312 is input to the radar fusion module 330, where it is combined with the output from the camera-lidar fusion module 320.

In general, to incorporate radar data for use in an object detection model, a radar point cloud is extracted from the raw radar data cube using a fixed heuristic, and the radar point cloud is fused with camera and lidar data. However, valuable radar data can be lost in the process of extracting the point cloud. Thus, in order to retain and process all valuable data, it is preferable to process the raw radar data cube directly using a neural network (e.g., a convolutional neural network, a transformer, etc.) rather than processing the radar point cloud. However, processing the entire raw radar data cube using a neural network is computationally expensive.

According to various implementations, an object detection model is provided that processes camera and lidar data and then uses an attention module to predict which parts of the raw radar cube may contain information missing from the camera and lidar data. In some examples, the attention module can use a heatmap to identify parts of the raw radar cube that may contain missing information. In some examples, the attention module uses a transformer to query various regions of the raw radar data cube and identify parts of the raw radar cube that may contain missing information. The identified parts of the raw radar data cube can then be processed while the remaining parts of the raw radar data cube remain unprocessed. In various examples, features can be extracted from identified regions of the radar data cube using a neural network (e.g., a convolutional neural network, a transformer, etc).

Exemplary Method for Object Detection

Figure 4:
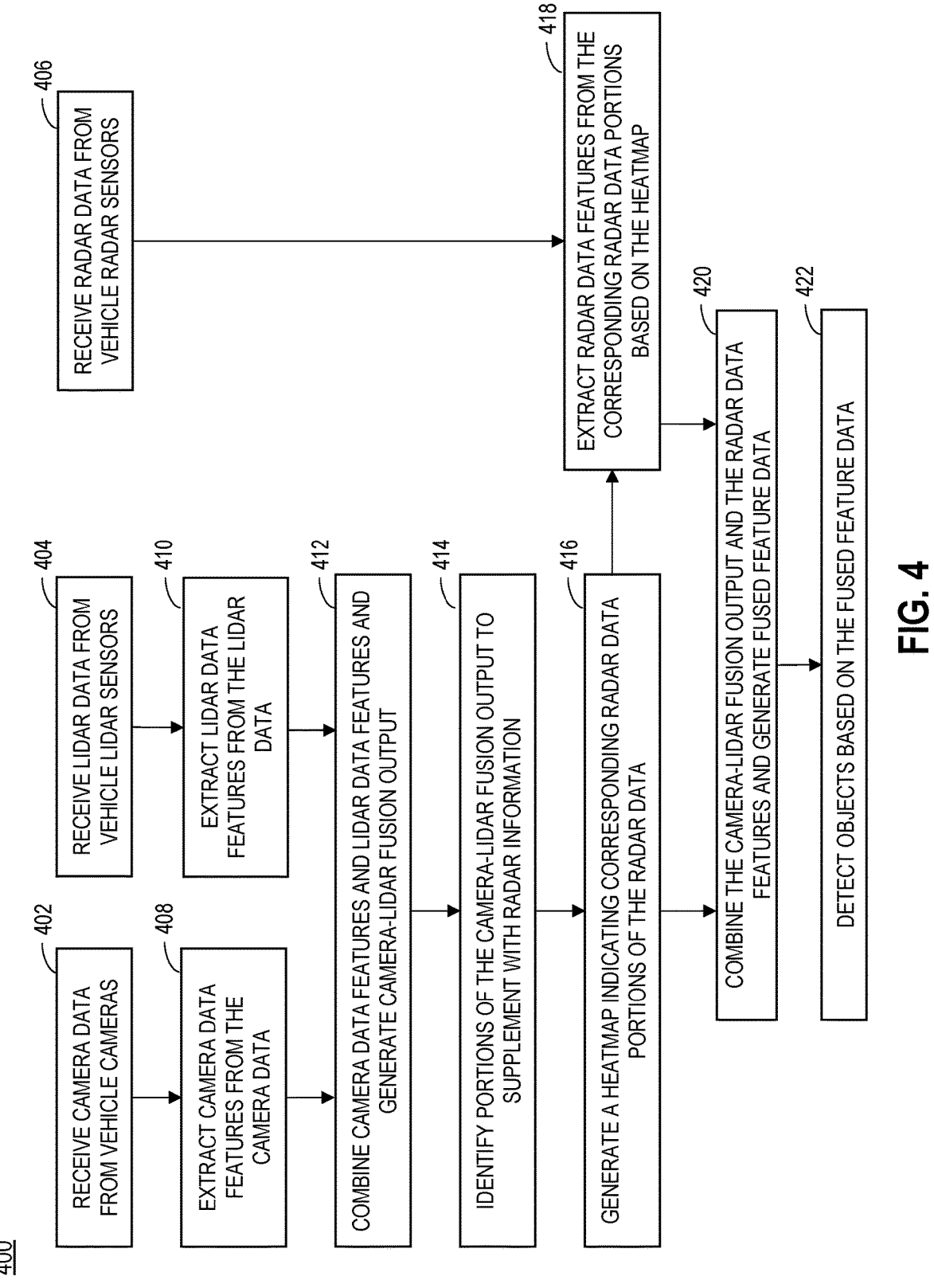
FIG. 4 is a flowchart illustrating a method for object detection, according to some aspects of the disclosed technology.

FIG. 4 is a flowchart illustrating a method 400 for object detection, according to some aspects of the disclosed technology. In particular, the object detection method 400 is a method for a feature fusion part to process camera and lidar data, and, based on camera and lidar data, identify selected portions of radar data for processing. Selectively processing radar data for areas of interest can improve efficiency of object detection and result in cost savings. The object detection method 400 begins by receiving camera data from vehicle cameras at step 402, receiving lidar data from vehicle lidar sensors at step 404, and receiving radar data from vehicle radar sensors at step 406. In various examples, steps 402, 404, and 406 can occur concurrently. In general, camera, lidar, and radar data can be received as it is sensed at the various corresponding sensors. In some examples, camera, lidar, and radar data can be stored in memory.

At step 408, camera data features are extracted from the camera data by a camera feature extractor. At step 410, lidar data features are extracted from the lidar data by a lidar feature extractor. In various examples, the camera feature extractor and/or the lidar feature extractor can be neural network models designed for feature extraction.

At step 412, the output of the camera feature extractor and the output of the lidar feature extractor are combined at a camera-lidar fusion module. The fusion of the extracted camera features with the extracted lidar features can be represented as a matrix of fused values. In some examples, the extracted camera features are represented in perspective view and the extracted lidar features are represented in birds eye view. In some examples, a camera-lidar fusion module can output a sequence of tokens representing the combined extracted features. In some examples, the camera features are transformed to birds eye view features, such that both the lidar features and the camera features are in birds eye view when the features are combined at the camera-lidar fusion module. In some examples, the method includes transforming the camera features from perspective view to bird's eye view using an orthographic feature transform. In various examples, an orthographic feature transform can be performed by projecting voxels from a birds eye view grid into the perspective view of the camera features, gathering the camera features with some reduction operation (e.g., a mean) and processing the gathered reduced data with a neural network to get the features for the voxel in the birds eye view grid. In some examples, an orthographic feature transform can be performed using a transformer to project perspective view feature into birds eye view. In various examples, when the extracted camera and lidar features are to be processed by a convolutional neural network, the extracted camera features are converted to birds eye view. When the extracted camera and lidar features are to be processed by a transformer model, the extracted camera features can remain in perspective view.

In one example, the feature extractors output both camera features and lidar features in birds eye view with the same spatial dimension H×W. Note that the camera feature extractor can have a different number of channels from the lidar feature extractor. In one example the camera features are output as a 3D tensor having the shape C1×H×W and the lidar features are output as a 3D tensor having the shape C2×H×W. The stacked lidar+camera features have a 3D tensor with the shape: (C1+C2)×H×W. The stacked lidar+ camera features can be processed in a convolutional neural network, which outputs fused features as a 3D tensor having the shape C3×H×W (a birds eye view representation). In further examples, different representations are used for the fused features.

The method 400 can include combining the camera features and the lidar features and outputting fused features that combine information from the camera features and the lidar features, even when salient or important information is positioned differently in the camera features and the lidar features. In some examples, outputting the fused features includes outputting a fused feature vector, a fused feature matrix, a fused feature tensor, or a token sequence (in which each token is a vector). In some implementations, only one of camera data and lidar data is used in the object detection model.

At step 414, portions of the camera-lidar fusion output to supplement with radar information are identified at an attention module, which can be a neural network (e.g., a convolutional neural network, a transformer, etc). In some examples, additional input data from other sensors can be used in identifying the portions of the camera-lidar fusion output to supplement with radar information. For example, vehicle velocity, acceleration, ambient weather conditions, the planned path of the vehicle, and other data can be used in identifying the portions of the camera-lidar fusion output to supplement with radar information.

At step 416, a heatmap is generated indicating radar data portions corresponding to the identified portions of the camera-lidar fusion output to supplement with radar information. The heatmap indicates areas in which radar data can be used to provide additional information. In various examples, the heatmap is generated by the attention module. In various examples, generating the heatmap includes predicting which parts of the raw radar cube data contain additional information beyond what is present in the camera-lidar fusion output.

Once the heatmap is generated at step 416, at step 418, radar data features are extracted from the corresponding radar data portions based on the heatmap. In particular, the heatmap indicates the areas of the radar data cube which are to be processed. In some examples, the heatmap includes indices of locations in the radar cube to be processed, and based on the indicated locations, convolutions on the radar cube are performed. In some examples, applying the heatmask to the radar data includes applying a mask to the raw radar data cube, wherein the mask indicates the areas of the raw radar data cube that are to be processed by the radar feature extractor. In some examples, the method includes beamforming the received radar data based on the heatmap, such that beamforming is only performed on the radar data corresponding to the areas of the heatmap for which radar data is to be extracted.

At step 420, the camera-lidar fusion output and the extracted radar data features are combined to generate fused feature data. At step 422, objects in the environment are detected based on the fused feature data. In some examples, an object detection head receives the fused feature data and outputs predicted objects.

Exemplary AV Management System

Figure 5:
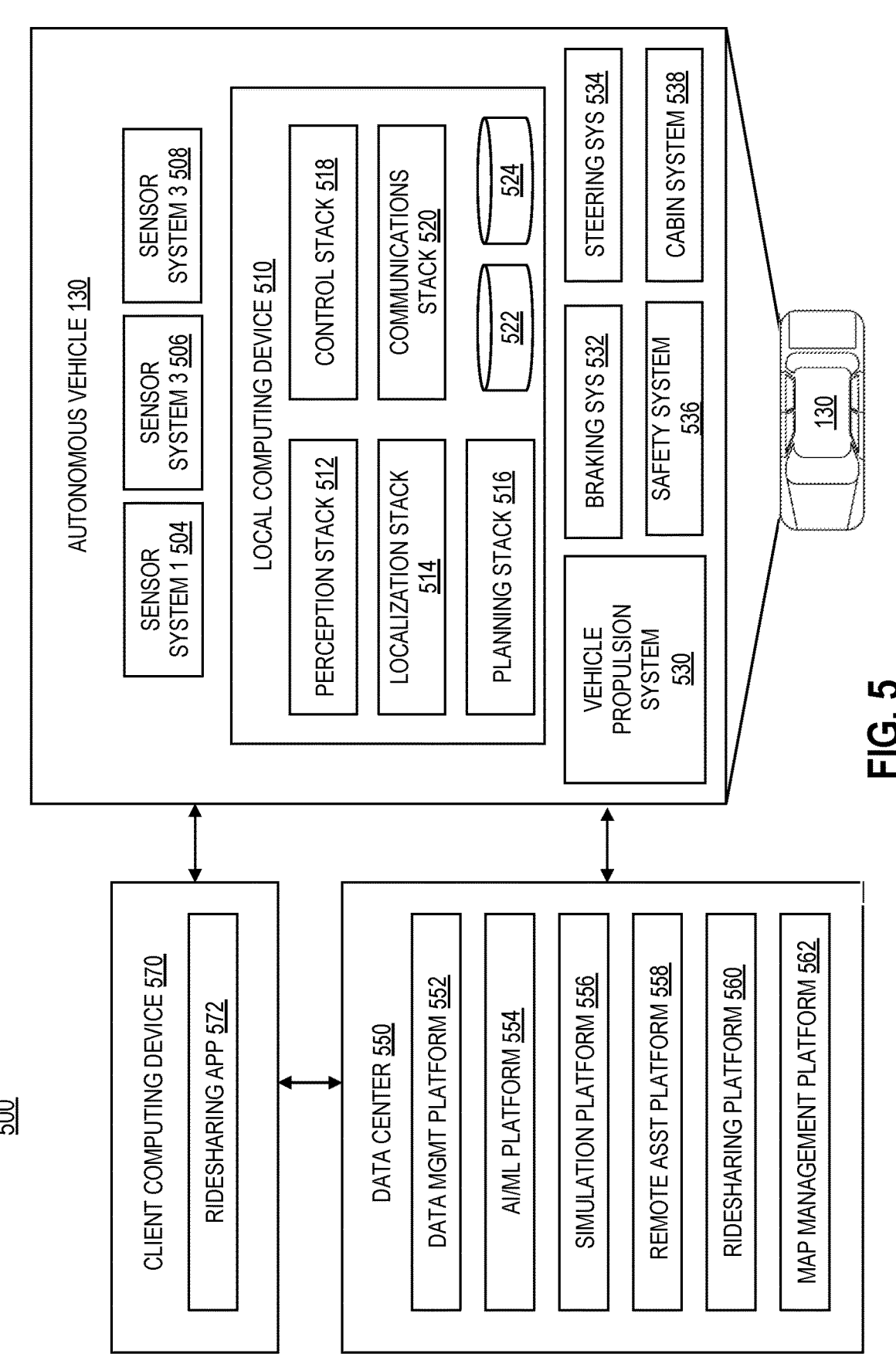
FIG. 5 illustrates an example system environment that can be used to facilitate autonomous vehicle (AV) dispatch and operations, according to some aspects of the disclosed technology.

Turning now to FIG. 5, this figure illustrates an example of an AV management system 500, in which some of the aspects of the present disclosure can be implemented. One of ordinary skill in the art will understand that, for the AV management system 500 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 130, a data center 550, and a client computing device 570. The AV 130, the data center 550, and the client computing device 570 may communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 504, 506, and 508. The sensor systems 504-508 may include different types of sensors and may be arranged about the AV 130. For instance, the sensor systems 504-508 may comprise Inertial Measurement Units (IMUs), cameras (e.g., still image cameras, video cameras, thermal cameras, signal cameras, etc.), light sensors (e.g., lidar systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SO-NAR) systems, ultrasonic sensors, etc.), time-of-flight sensors, structured light sensor, infrared sensors, signal light sensors, thermal imaging sensors, engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 may be a camera system, the sensor system 506 may be a lidar system, and the sensor system 508 may be a RADAR system. Other embodiments may include any other number and type of sensors.

AV 130 may also include several mechanical systems that may be used to maneuver or operate AV 130. For instance, mechanical systems may include vehicle propulsion system 530, braking system 532, steering system 534, safety system 536, and cabin system 538, among other systems. Vehicle propulsion system 530 may include an electric motor, an internal combustion engine, or both. The braking system 532 may include an engine brake, a wheel braking system (e.g., a disc braking system that utilizes brake pads), hydraulics, actuators, and/or any other suitable componentry configured to assist in decelerating AV 130. The steering system 534 may include suitable componentry configured to control the direction of movement of the AV 130 during navigation. Safety system 536 may include lights and signal indicators, a parking brake, airbags, and so forth. The cabin system 538 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 538 may include one or more client interfaces (e.g., GUIs, Voice User Interfaces (VUIs), etc.) for controlling certain aspects of the mechanical systems 530-538.

AV 130 may additionally include a local computing device 510 that is in communication with the sensor systems 504-508, the mechanical systems 530-538, the data center 550, and the client computing device 570, among other systems. The local computing device 510 may include one or more processors and memory, including instructions that may be executed by the one or more processors. The instructions may make up one or more software stacks or components responsible for controlling the AV 130; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception, understanding, and tracking part 104, a mapping and localization stack 514, a prediction part 106, a planning part 110, and controls part 112, a communications stack 520, an HD geospatial database 522, and an AV operational database 524, among other stacks and systems.

Perception, understanding, and tracking part 104 may enable the AV 130 to "see" (e.g., via cameras, lidar sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception, understanding, and tracking part 104 may detect and classify objects and determine their current and predicted locations, speeds, directions, and the like. In addition, the perception, understanding, and tracking part 104 may determine the free space around the AV 130 (e.g., to maintain a safe distance from other objects, change lanes, park the AV, etc.). The perception, understanding, and tracking part 104 may also identify environmental uncertainties, such as where to look for moving objects, flag areas that may be obscured or blocked from view, and so forth. Exemplary implementations of perception, understanding, and tracking part 104 are illustrated in the figures.

Prediction part 106 may predict behaviors and movements of tracked objects sensed by perception, understanding, and tracking part 104.

Mapping and localization stack 514 may determine the AV's position and orientation (pose) using different methods from multiple systems (e.g., GPS, IMUs, cameras, lidar, RADAR, ultrasonic sensors, the HD geospatial database 522, etc.). For example, in some embodiments, the AV 130 may compare sensor data captured in real-time by the sensor systems 504-508 to data in the HD geospatial database 522 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., lidar). If the mapping and localization information from one system is unavailable, the AV 130 may use mapping and localization information from a redundant system and/or from remote data sources.

Planning part 110 may determine how to maneuver or operate the AV 130 safely and efficiently in its environment. For instance, the planning part 110 may produce a plan for the AV 130, which can include a (reference) trajectory. Planning part 110 may receive information generated by perception, understanding, and tracking part 104. For example, the planning part 110 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an emergency vehicle (EMV) blaring a siren, intersections, occluded areas, street closures for construction or street repairs, DPVs, etc.), user input, and other relevant data for directing the AV 130 from one point to another. The planning part 110 may determine multiple sets of one or more mechanical operations that the AV 130 may perform (e.g., go straight at a specified speed or rate of acceleration, including maintaining the same speed or decelerating; turn on the left-blinker, decelerate if the AV is above a threshold range for turning, and turn left; turn on the right-blinker, accelerate if the AV is stopped or below the threshold range for turning, and turn right; decelerate until completely stopped and reverse; etc.), and select the best one to meet changing road conditions and events.

Controls part 112 may manage the operation of the vehicle propulsion system 530, the braking system 532, the steering system 534, the safety system 536, and the cabin system 538. Controls part 112 may receive a plan from the planning part 110. Controls part 112 may receive sensor signals from the sensor systems 504-508 as well as communicate with other stacks or components of the local computing device 510 or a remote system (e.g., the data center 550) to effectuate the operation of the AV 130. For example, Controls part 112 may implement the final path or actions from the multiple paths or actions provided by the planning part 110. The implementation may involve turning the plan from the planning part 110 into commands for vehicle hardware controls such as the actuators that control the AV's steering, throttle, brake, and drive unit.

The communication stack 520 may transmit and receive signals between the various stacks and other components of the AV 130 and between the AV 130, the data center 550, the client computing device 570, and other remote systems. The communication stack 520 may enable the local computing device 510 to exchange information remotely over a network. Communication stack 520 may also facilitate local exchange of information, such as through a wired connection or a local wireless connection.

The HD geospatial database 522 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 524 may store raw AV data generated by the sensor systems 504-508 and other components of the AV 130 and/or data received by the AV 130 from remote systems (e.g., the data center 550, the client computing device 570, etc.). In some embodiments, the raw AV data may include HD lidar point cloud data, image or video data, RADAR data, GPS data, and other sensor data that the data center 550 may use for creating or updating AV geospatial data as discussed further below with respect to 5 and elsewhere in the present disclosure.

Data center 550 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 550 may include one or more computing devices remote to the local computing device 510 for managing a fleet of AVs and AV-related services. For example, in addition to managing the AV 130, the data center 550 may also support a ridesharing service, a delivery service, a remote/roadside assistance service, street services (e.g., street mapping, street patrol, street cleaning, street metering, parking reservation, etc.), and the like.

Data center 550 may send and receive various signals to and from the AV 130 and the client computing device 570. These signals may include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a remote assistance platform 558, a ridesharing platform 560, and a map management platform 562, among other systems.

Data management platform 552 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 550 may access data stored by the data management platform 552 to provide their respective services.

The AI/ML platform 554 may provide the infrastructure for training and evaluating machine learning algorithms for operating the AV 130, the remote assistance platform 558, the ridesharing platform 560, the map management platform 562, and other platforms and systems. Using the AI/ML platform 554, data scientists may prepare data sets from the data management platform 552; select, design, and train machine learning models; evaluate, refine, and deploy the models; maintain, monitor, and retrain the models; and so on.

The remote assistance platform 558 may generate and transmit instructions regarding the operation of the AV 130. For example, in response to an output of the AI/ML platform 554 or other system of the data center 550, the remote assistance platform 558 may prepare instructions for one or more stacks or other components of the AV 130.

The ridesharing platform 560 may interact with a customer of a ridesharing service via a ridesharing application 572 executing on the client computing device 570. The client computing device 570 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 572. The client computing device 570 may be a customer's mobile computing device or a computing device integrated with the AV 130 (e.g., the local computing device 510). The ridesharing platform 560 may receive requests to be picked up or dropped off from the ridesharing application 572 and dispatch the AV 130 for the trip.

Map management platform 562 may provide a set of tools for the manipulation and management of geographic and spatial (geospatial) and related attribute data. The data management platform 552 may receive lidar point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data.

In some embodiments, the map viewing services of map management platform 562 may be modularized and deployed as part of one or more of the platforms and systems of the data center 550. For example, the AI/ML platform 554 may incorporate the map viewing services for visualizing the effectiveness of various object detection or object classification models, the remote assistance platform 558 may incorporate the map viewing services for replaying traffic incidents to facilitate and coordinate aid, the ridesharing platform 560 may incorporate the map viewing services into the client application 572 to enable passengers to view the AV 130 in transit enroute to a pick-up or drop-off location, and so on.

Exemplary Processor-Based System

Figure 6:
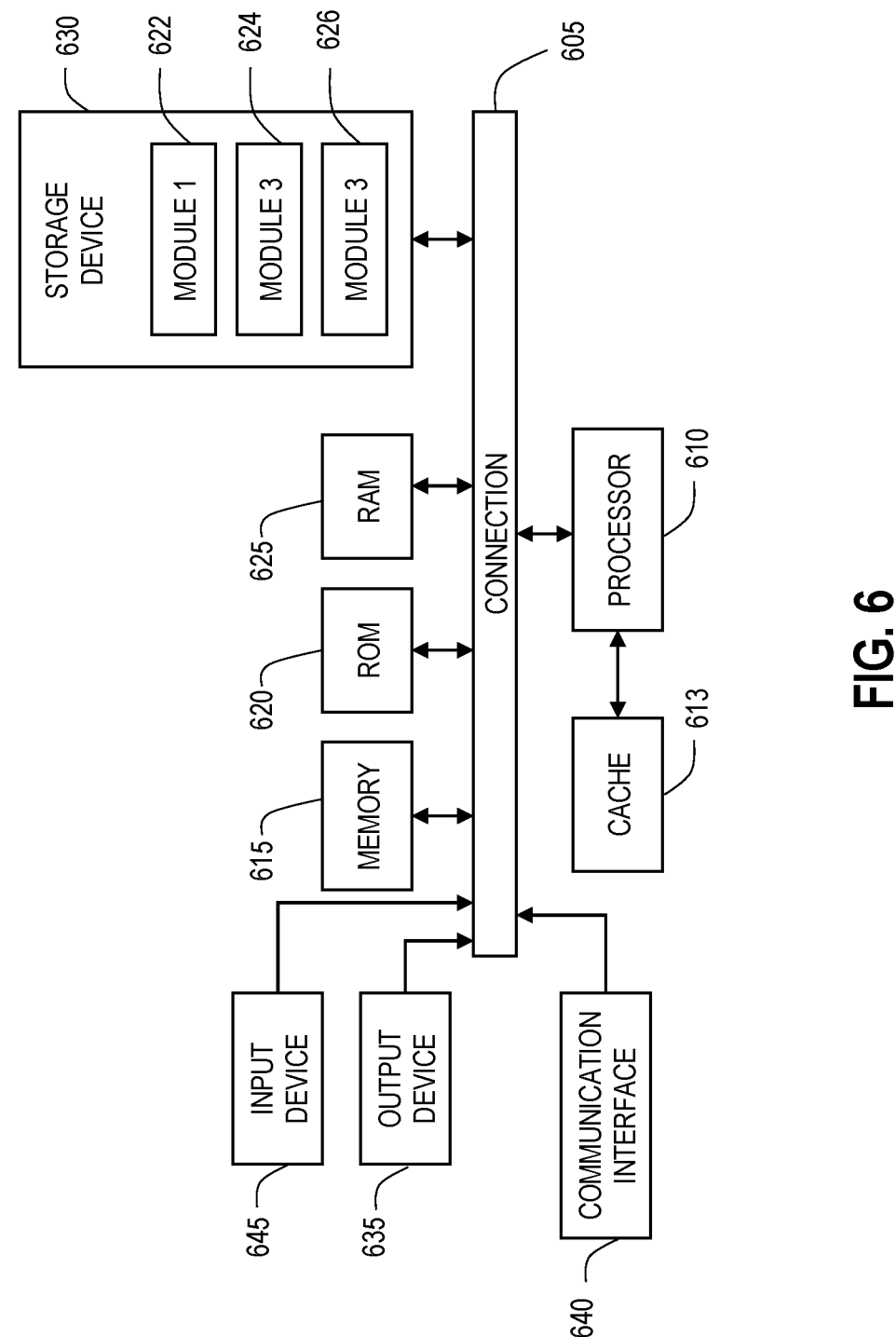
FIG. 6 shows an example embodiment of a system for implementing certain aspects of the present technology.

FIG. 6 illustrates an exemplary computing system with which some aspects of the subject technology may be implemented. For example, processor-based system 600 may be any computing device making up, or any component thereof in which the components of the system are in communication with each other using connection 605. Connection 605 may be a physical connection via a bus, or a direct connection into processor 610, such as in a chipset architecture. Connection 605 may also be a virtual connection, networked connection, or logical connection.

In some embodiments, computing system 600 represents the local computing device 510 of FIG. 5. In some embodiments, one or more of the described system components represents many such components each performing some or all of the function for which the component is described. In some embodiments, the components may be physical or virtual devices.

Exemplary system 600 includes at least one processor 610 and connection 605 that couples various system components including system memory 615, such as Read-Only Memory (ROM) 620 and Random-Access Memory (RAM) 625 to processor 610. at least one processor 610 may include one or more of: Central Processing Unit (CPU), Graphical Processing Unit (GPU), machine learning processor, neural network processor, or some other suitable computing processor. Computing system 600 may include a cache of high-speed memory 612 connected directly with, in close proximity to, or integrated as part of processor 610.

Processor 610 may include any general-purpose processor and a hardware service or software service. Processor 610 may essentially be a completely self-contained computing system, containing multiple cores or processors, a bus, memory controller, cache, etc. A multi-core processor may be symmetric or asymmetric.

Storage device 630 may be a non-volatile and/or non-transitory and/or computer-readable memory device and may be a hard disk or other types of computer-readable media which may store data that is accessible by a computer.

Storage device 630 may include software services, servers, services, etc., that when the code that defines such software is executed by the processor 610, it causes the system 600 to perform a function. Storage device 630 may store instructions that encode functionalities of perception, understanding, and tracking part 104, prediction part 106, planning part 110, and controls part 112. In some examples, a module 832, 834, 836 is an object detection model, and is configured to detect objects primarily based on camera and lidar data as described herein. The object detection model can include a machine learning model for minimizing radar data used in identifying objects.

In some embodiments, a hardware service that performs a particular function may include the software component stored in a computer-readable medium in connection with the necessary hardware components, such as processor 610, connection 605, output device 635, etc., to carry out the function.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms known to those of skill in the art. In some instances, multimodal systems may enable a user to provide multiple types of input/output to communicate with computing system 600. Computing system 600 may include communications interface 640, which may generally govern and manage the user input and system output. The communication interface may perform or facilitate receipt and/or transmission of wired or wireless communications via wired and/or wireless transceivers.

Figure 7:
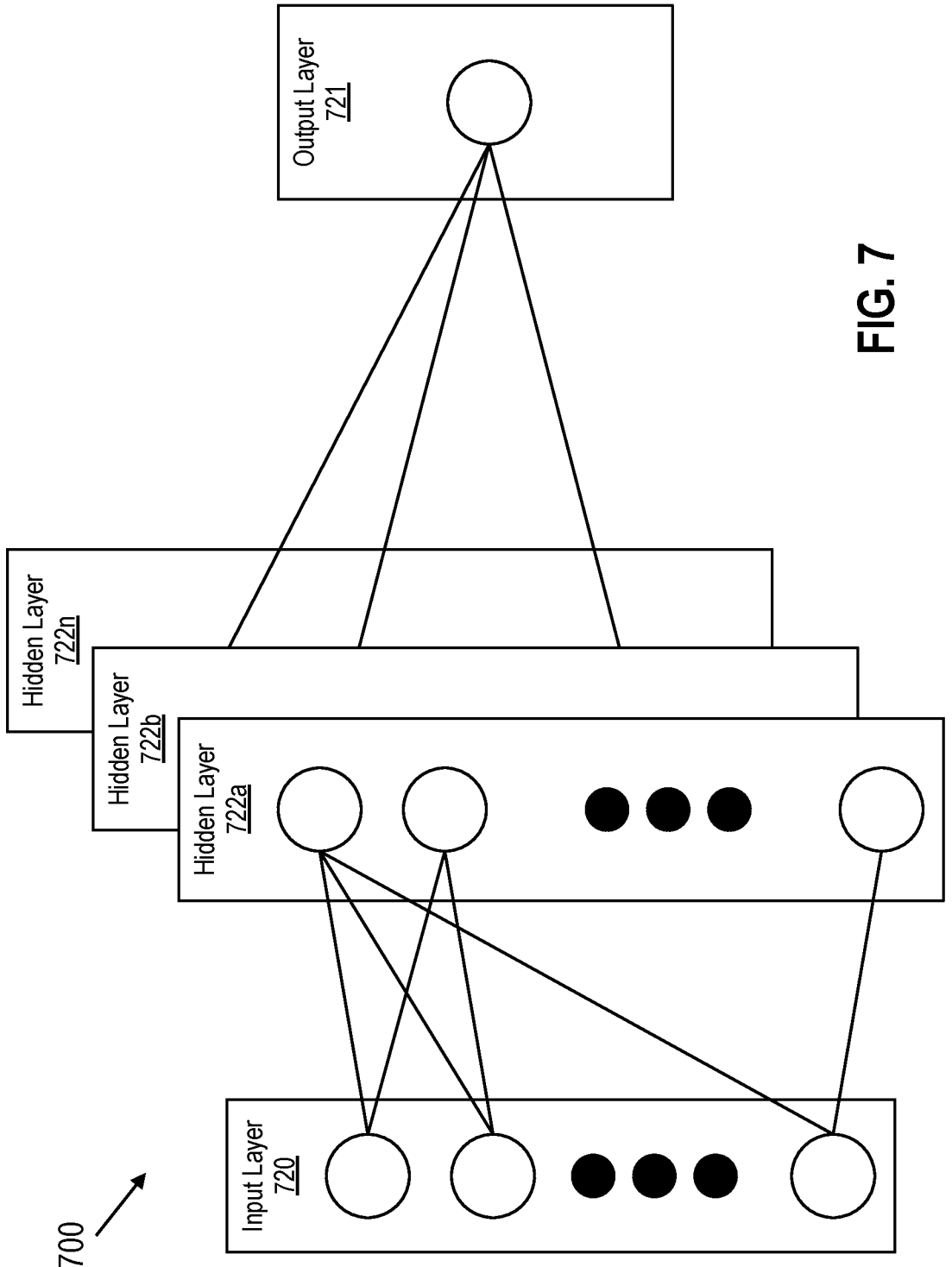
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an autonomous vehicle, including detected objects. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722a, 722b, through 722n. In one illustrative example, the output layer 721 can provide object detection parameters that can be used/ingested by a differential simulator to estimate an object bounding box and indicate the likelihood of an object and of correct object parameters.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a vehicle for detecting objects in a vehicle environment, comprising: cameras to generate camera data; lidar sensors to generate lidar data; radar sensors to generate radar data; an object detection module, including: a camera feature extractor to extract camera data features from the camera data; a lidar feature extractor to extract lidar data features from the lidar data; a camera-lidar fusion module to combine the camera data features and the lidar data features and generate a camera-lidar fusion output; an attention module configured to: receive the camera-lidar fusion output, identify portions of the camera-lidar fusion output to supplement with radar information, and generate a heatmap indicating radar data portions of the radar data corresponding to the portions of the camera-lidar fusion output; a radar feature extractor to extract radar data features from the radar data portions based on the heatmap; and a radar fusion module to combine the camera-lidar fusion output and the radar data features and generate fused feature data.

Example 2 provides a vehicle, system, and/or method according to any of the preceding and/or following examples, wherein the object detection module further includes a radar data beamformer to beamform the radar data portions based on the heatmap and generate beamformed radar data portions, wherein the radar feature extractor extracts the radar data features from the beamformed radar data portions.

Example 3 provides a vehicle, system, and/or method according to any of the preceding and/or following examples, wherein the attention module is further configured to receive additional vehicle data, wherein the additional vehicle data includes at least one of: vehicle velocity, ambient weather conditions, and a planned path of the vehicle.

Example 4 provides a vehicle, system, and/or method according to any of the preceding and/or following examples, wherein the heatmap is a mask, and the radar sensor data is a raw radar data cube, and wherein the mask is applied to the raw radar data cube.

Example 5 provides a vehicle, system, and/or method according to any of the preceding and/or following examples, wherein the attention module is configured to predict which parts of the raw radar data cube contain missing information from the camera-lidar fusion output, and generate the heatmap based on the missing information.

Example 6 provides a vehicle, system, and/or method according to any of the preceding and/or following examples, wherein the attention module is a transformer based model, wherein the camera data features are in a perspective view, and wherein the lidar data features are in a birds eye view.

Example 7 provides a vehicle, system, and/or method according to any of the preceding and/or following examples, wherein the attention module is a convolutional neural network, wherein the camera data features are in a perspective view, wherein the lidar data features are in a birds eye view, and further comprising a transformer to transform the camera data features to the birds eye view using an orthographic feature transform.

Example 8 provides a computer-implemented method for object detection in a vehicle, the method comprising: receiving camera data from vehicle cameras; receiving lidar data from vehicle lidar sensors; receiving radar data from vehicle radar sensors; extracting camera data features from the camera data; extracting lidar data features from the lidar data; combining the camera data features and the lidar data features at a camera-lidar fusion module and generating camera-lidar fusion output; identifying, at an attention module, portions of the camera-lidar fusion output to supplement with radar information; generating a heatmap indicating corresponding radar data portions of the radar data; extracting radar data features from the corresponding radar data portions based on the heatmap; combining the camera-lidar fusion output and the radar data features and generating fused feature data; and detecting an object based on the fused feature data.

Example 9 provides a vehicle, system, and/or method according to any of the preceding and/or following examples, further comprising: beamforming the corresponding radar data portions based on the heatmap; and generating beamformed radar data portions; wherein extracting the radar data features includes extracting the radar data features from the beamformed radar data portions.

Example 10 provides a vehicle, system, and/or method according to any of the preceding and/or following examples, further comprising receiving, at the attention module additional vehicle data, wherein identifying portions of the camera-lidar fusion output to supplement with radar information includes identifying based in part on the additional vehicle data, and wherein the additional vehicle data includes at least one of: vehicle velocity, ambient weather conditions, and a planned path of the vehicle.

Example 11 provides a vehicle, system, and/or method according to any of the preceding and/or following examples, wherein the heatmap is a mask, and the radar sensor data is a raw radar data cube, and further comprising applying the mask to the raw radar data cube.

Example 12 provides a vehicle, system, and/or method according to any of the preceding and/or following examples, further comprising: predicting, at the attention module, which parts of the raw radar data cube contain missing information from the camera-lidar fusion output; and generating the heatmap based on the missing information.

Example 13 provides a vehicle, system, and/or method according to any of the preceding and/or following examples, wherein the attention module is a transformer based model, wherein the camera data features are in a perspective view, and wherein the lidar data features are in a birds eye view.

Example 14 provides a vehicle, system, and/or method according to any of the preceding and/or following examples, wherein the attention module is a convolutional neural network, wherein the camera data features are in a perspective view, wherein the lidar data features are in a birds eye view, and further comprising transforming the camera data features to the birds eye view using an orthographic feature transform.

Example 15 provides a system for object detection in an environment, comprising: a camera feature extractor to extract camera data features from camera data; a lidar feature extractor to extract lidar data features from lidar data; a camera-lidar fusion module to combine the camera data features and the lidar data features and generate a camera-lidar fusion output; an attention module configured to: receive the camera-lidar fusion output, identify portions of the camera-lidar fusion output to supplement with radar information, and generate a heatmap indicating corresponding radar data portions of the radar data; a radar feature extractor to extract radar data features from the corresponding radar data portions based on the heatmap; and a radar fusion module to combine the camera-lidar fusion output and the radar data features and generate fused feature data.

Example 16 provides a vehicle, system, and/or method according to any of the preceding and/or following examples, further comprising a radar data beamformer to beamform the radar data portions based on the heatmap and generate beamformed radar data portions, wherein the radar feature extractor extracts the radar data features from the beamformed radar data portions.

Example 17 provides a vehicle, system, and/or method according to any of the preceding and/or following examples, wherein the attention module is further configured to receive additional vehicle data, wherein the additional vehicle data includes at least one of: vehicle velocity, ambient weather conditions, and a planned path of the vehicle.

Example 18 provides a vehicle, system, and/or method according to any of the preceding and/or following examples, wherein the heatmap is a mask, and the radar sensor data is a raw radar data cube, and wherein the mask is applied to the raw radar data cube.

Example 19 provides a vehicle, system, and/or method according to any of the preceding and/or following examples, wherein the attention module is configured to predict which parts of the raw radar data cube contain missing information from the camera-lidar fusion output, and generate the heatmap based on the missing information.

Example 20 provides a vehicle, system, and/or method according to any of the preceding and/or following examples, wherein the attention module is a transformer based model, wherein the camera data features are in a perspective view, and wherein the lidar data features are in a birds eye view.

Example 20 provides a vehicle, system, and/or method according to any of the preceding and/or following examples, wherein the attention module is a convolutional neural network, wherein the camera data features are in a perspective view, wherein the lidar data features are in a birds eye view, and further comprising a transformer to transform the camera data features to the birds eye view using an orthographic feature transform.

Example 21 provides a vehicle for detecting objects in a vehicle environment, comprising: cameras to generate camera data; lidar sensors to generate lidar data; radar sensors to generate radar data; a feature fusion module, including: a camera feature extractor to extract camera data features from the camera data; a lidar feature extractor to extract lidar data features from the lidar data; a camera-lidar fusion module to combine the camera data features and the lidar data features and generate a camera-lidar fusion output; an attention module configured to: receive the camera-lidar fusion output, identify portions of the camera-lidar fusion output to supplement with radar information, and generate a heatmap indicating radar data portions of the radar data corresponding to the portions of the camera-lidar fusion output; a radar feature extractor to extract radar data features from the radar data portions based on the heatmap; and a radar fusion module to combine the camera-lidar fusion output and the radar data features and generate fused feature data.

Example 22 provides a vehicle, system, and/or method according to any of the preceding and/or following examples, further comprising an object detection head, configured to receive the fused feature data and detect objects based on the fused feature data.

Example 23 includes one or more non-transitory computer-readable media storing instructions that, when executed by one or more processors, cause the one or more processors to perform any one of the computer-implemented methods of Examples 9-15.

Example 24 is an apparatus comprising means to carry out any one of the computer-implemented methods of Examples 9-15.

What is claimed is:

1. A vehicle for detecting objects in a vehicle environment, comprising:
   cameras to generate camera data;
   LIDAR sensors to generate LIDAR data;
   radar sensors to generate radar data; and
   a feature fusion module, including:
      a camera feature extractor to extract camera data features from the camera data;

a LIDAR feature extractor to extract LIDAR data features from the LIDAR data;
      a camera-LIDAR fusion module to combine the camera data features and the LIDAR data features and generate a camera-LIDAR fusion output;
      an attention module configured to:
         receive the camera-LIDAR fusion output,
         identify, from the camera-LIDAR fusion output, portions of the camera-LIDAR fusion output to supplement with radar information, and
         generate a heatmap indicating radar data portions of the radar data which correspond to the portions of the camera-LIDAR fusion output;
      a radar feature extractor to extract radar data features from the radar data portions which correspond to the portions of the camera-LIDAR fusion output, based on the heatmap; and
      a radar fusion module to combine the camera-LIDAR fusion output and the radar data features and generate fused feature data.

2. The vehicle of claim 1, wherein the feature fusion module further includes a radar data beamformer to beamform the radar data portions based on the heatmap and generate beamformed radar data portions, wherein the radar feature extractor extracts the radar data features from the beamformed radar data portions.

3. The vehicle of claim 1, wherein the attention module is further configured to receive additional vehicle data, wherein the additional vehicle data includes at least one of: vehicle velocity, ambient weather conditions, and a planned path of the vehicle.

4. The vehicle of claim 1, wherein the heatmap is a mask, and the radar data is a raw radar data cube, and wherein the mask is applied to the raw radar data cube.

5. The vehicle of claim 1, wherein:
   the radar data is a raw radar data cube; and
   the attention module is configured to:
      predict which parts of the raw radar data cube contain information which is missing from the camera-LIDAR fusion output, and
      generate the heatmap based on the information which is missing from the camera-LIDAR fusion output.

6. The vehicle of claim 1, wherein the attention module is a transformer based model, wherein the camera data features are in a perspective view, and wherein the LIDAR data features are in a birds eye view.

7. The vehicle of claim 1, wherein the attention module is a convolutional neural network, wherein the camera data features are in a perspective view, wherein the LIDAR data features are in a birds eye view, and further comprising a conversion module to transform the camera data features to the birds eye view using an orthographic feature transform.

8. The vehicle of claim 1, further comprising an object detection head, configured to receive the fused feature data and detect objects based on the fused feature data.

9. A computer-implemented method for object detection in a vehicle, the computer-implemented method comprising:
   receiving camera data from vehicle cameras;
   receiving LIDAR data from vehicle LIDAR sensors;
   receiving radar data from vehicle radar sensors;
   extracting camera data features from the camera data;
   extracting LIDAR data features from the LIDAR data;
   combining the camera data features and the LIDAR data features at a camera-LIDAR fusion module and generating camera-LIDAR fusion output;

identifying, at an attention module, from the camera-LIDAR fusion output, portions of the camera-LIDAR fusion output to supplement with radar information;

generating a heatmap indicating radar data portions of the radar data which correspond to the portions of the camera-LIDAR fusion output;

extracting radar data features from the radar data portions which correspond to the portions of the camera-LIDAR fusion output, based on the heatmap;

combining the camera-LIDAR fusion output and the radar data features and generating fused feature data; and detecting at least one object based on the fused feature data.

10. The computer-implemented method of claim 9, further comprising:

beamforming the radar data portions based on the heatmap; and generating beamformed radar data portions;

wherein extracting the radar data features includes extracting the radar data features from the beamformed radar data portions.

11. The computer-implemented method of claim 9, further comprising:

receiving, at the attention module, additional vehicle data, wherein identifying the portions of the camera-LIDAR fusion output to supplement with radar information is based in part on the additional vehicle data, and wherein the additional vehicle data includes at least one of: vehicle velocity, ambient weather conditions, and a planned path of the vehicle.

12. The computer-implemented method of claim 9, wherein the heatmap is a mask, the radar data is a raw radar data cube, and computer-implemented method further comprises applying the mask to the raw radar data cube.

13. The computer-implemented method of claim 9, wherein:

the radar data is a raw radar data cube; and the computer-implemented method further comprises:

predicting, at the attention module, which parts of the raw radar data cube contain information which is missing from the camera-LIDAR fusion output; and generating the heatmap based on the information which is missing from the camera-LIDAR fusion output.

14. The computer-implemented method of claim 9, wherein the attention module is a transformer based model, wherein the camera data features are in a perspective view, and wherein the LIDAR data features are in a birds eye view.

15. The computer-implemented method of claim 9, wherein the attention module is a convolutional neural network, wherein the camera data features are in a perspective view, wherein the LIDAR data features are in a birds eye view, and further comprising transforming the camera data features to the birds eye view using an orthographic feature transform.

16. A system for feature fusion in an environment, comprising:

a camera feature extractor to extract camera data features from camera data;

a LIDAR feature extractor to extract LIDAR data features from LIDAR data;

a camera-LIDAR fusion module to combine the camera data features and the LIDAR data features and generate a camera-LIDAR fusion output;

an attention module configured to:

receive the camera-LIDAR fusion output, identify, from the camera-LIDAR fusion output, portions of the camera-LIDAR fusion output to supplement with radar information, and generate a heatmap indicating radar data portions of radar data which correspond to the portions of the camera-LIDAR fusion output;

a radar feature extractor to extract radar data features from the radar data portions which correspond to the portions of the camera-LIDAR fusion output, based on the heatmap; and a radar fusion module to combine the camera-LIDAR fusion output and the radar data features and generate fused feature data.

17. The system of claim 16, further comprising a radar data beamformer to beamform the radar data portions based on the heatmap and generate beamformed radar data portions, wherein the radar feature extractor extracts the radar data features from the beamformed radar data portions.

18. The system of claim 16, wherein the attention module is further configured to receive additional vehicle data, wherein the additional vehicle data includes at least one of: vehicle velocity, ambient weather conditions, and a planned path of a vehicle.

19. The system of claim 16, wherein the heatmap is a mask, and the radar data is a raw radar data cube, and wherein the mask is applied to the raw radar data cube.

20. The system of claim 16, wherein:

the radar data is a raw radar data cube; and the attention module is configured to:

predict which parts of the raw radar data cube contain information which is missing from the camera-LIDAR fusion output, and generate the heatmap based on the information which is missing from the camera-LIDAR fusion output.

* * * * *